(12) United States Patent
Coskun et al.

(10) Patent No.: US 11,948,170 B1
(45) Date of Patent: Apr. 2, 2024

(54) DIGITAL OUT OF HOME ADVERTISING FREQUENCY MAPS

(71) Applicant: Amazon Technologies, Inc., Seattle, WA (US)

(72) Inventors: Sarp Arda Coskun, Sammamish, WA (US); Ran Baror, Redmond, WA (US); Charles Joseph Rojo, Amity Harbor, NY (US); Robin Michelle Sweers, Seattle, WA (US); Kaushik Shankar, Seattle, WA (US); Timothy Jacob Lawson, Seattle, WA (US); Wei Zhan, Lynnwood, WA (US); Jason Mach, Seattle, WA (US); Ankit Rajiv Kuwadekar, Seattle, WA (US); Adam Jacob Gilbert, Seattle, WA (US); Michael Lee Loritsch, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 24 days.

(21) Appl. No.: 17/114,270

(22) Filed: Dec. 7, 2020

(51) Int. Cl.
*G06Q 30/02* (2023.01)
*G06Q 30/0251* (2023.01)
*G06Q 30/0204* (2023.01)

(52) U.S. Cl.
CPC ..... *G06Q 30/0261* (2013.01); *G06Q 30/0254* (2013.01); *G06Q 30/0255* (2013.01); *G06Q 30/0269* (2013.01); *G06Q 30/0205* (2013.01)

(58) Field of Classification Search
CPC ..................................................... G06Q 30/02
See application file for complete search history.

(56) References Cited

U.S. PATENT DOCUMENTS

| | | | | |
|---|---|---|---|---|
| 6,029,141 | A * | 2/2000 | Bezos | G06Q 30/0214 705/7.29 |
| 8,660,895 | B1 * | 2/2014 | Saurabh | G06Q 30/0242 705/14.42 |
| 2006/0053110 | A1 * | 3/2006 | McDonald | G06Q 30/02 |
| 2008/0102856 | A1 * | 5/2008 | Fortescue | H04W 4/02 455/456.1 |
| 2008/0189169 | A1 * | 8/2008 | Turpin | G06Q 30/0264 705/7.33 |

(Continued)

FOREIGN PATENT DOCUMENTS

WO      WO-2009120873 A2 * 10/2009 ............. G06Q 30/02

*Primary Examiner* — Vincent M Cao
(74) *Attorney, Agent, or Firm* — Eversheds Sutherland (US) LLP

(57) ABSTRACT

Systems, methods, and computer-readable media are disclosed for estimating impressions for a digital out of home (DOOH) advertising spaces (e.g., digital billboards and screens). A DOOH advertising system may determine the location of relevant DOOH advertising spaces and the location of certain consumers with known attributes and a known location. Based on this information the DOOH advertising system may estimate a number of impressions for a given DOOH advertising space and a given consumer segment associated with attributes of consumers within a certain distance from the DOOH advertising space. Using this information, the DOOH advertising spaces having the highest estimated impressions for a given consumer segment may be identified.

11 Claims, 7 Drawing Sheets

(56) References Cited

U.S. PATENT DOCUMENTS

| | | | |
|---|---|---|---|
| 2009/0292599 A1* | 11/2009 | Rampell | G06Q 30/0211 |
| | | | 705/14.23 |
| 2013/0129149 A1* | 5/2013 | Nandakumar | G06Q 30/0276 |
| | | | 382/104 |
| 2015/0073909 A1* | 3/2015 | Peden | G06Q 30/0267 |
| | | | 705/14.58 |
| 2017/0011430 A1* | 1/2017 | Sparrow | G06Q 30/0276 |
| 2018/0089717 A1* | 3/2018 | Morin | G06Q 30/0269 |
| 2018/0330403 A1* | 11/2018 | Olivieri | G06Q 30/0242 |
| 2019/0066167 A1* | 2/2019 | Warrum | G06Q 30/0249 |
| 2020/0184513 A1* | 6/2020 | Gentile | G06Q 30/0246 |

* cited by examiner

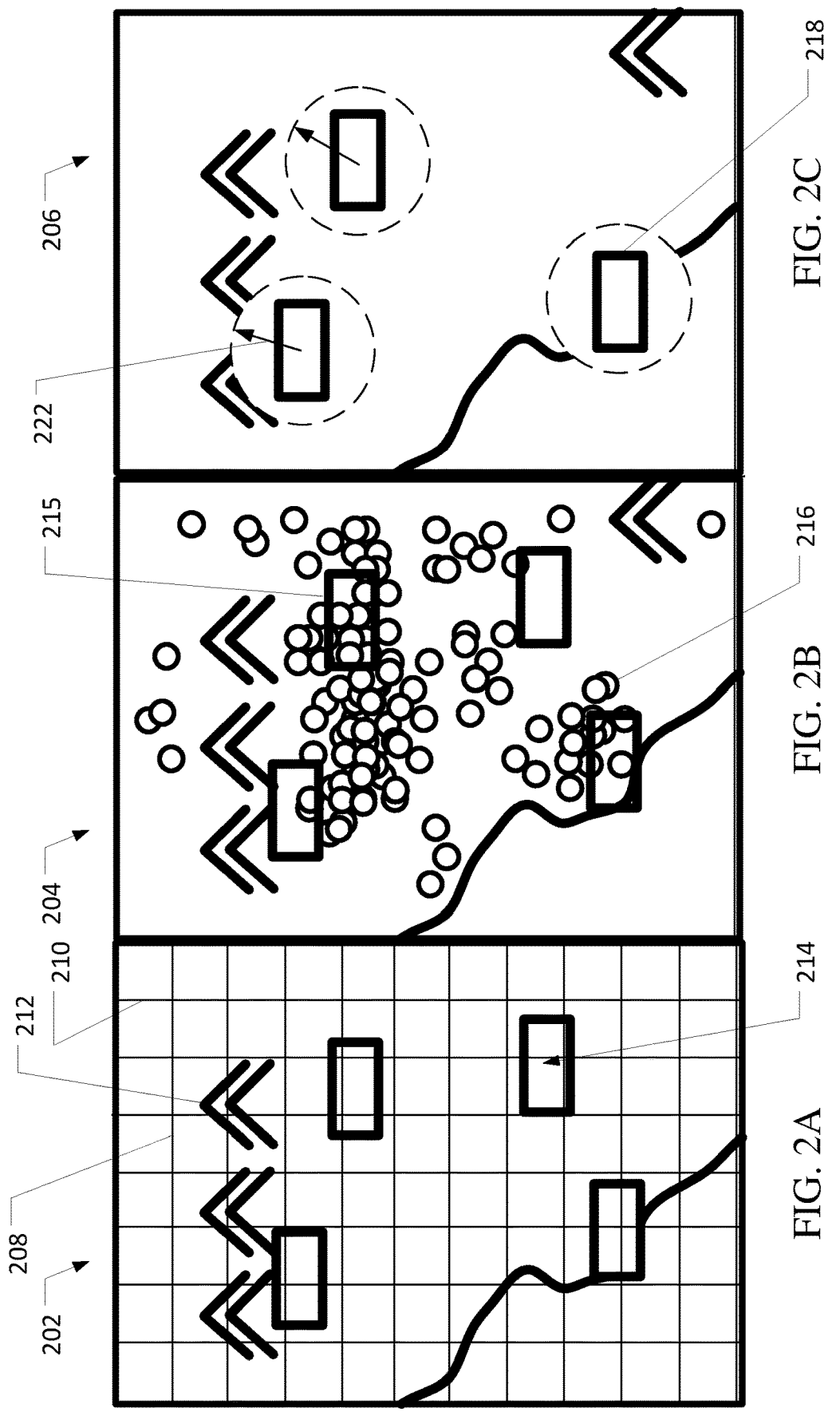

DIGITAL OUT OF HOME ADVERTISING FREQUENCY MAPS

BACKGROUND

With advancements in technology and electronics comes changes to our daily lives including changes in our methods for communicating, entertainment, and even shopping. Our world is becoming increasingly digital and advertising has quickly adjusted to consumer's digital presence. Digital advertisements are now common place on web-browsers, streaming services and are prevalent in various other computer and/or internet related activities. Additionally, Digital out of home (DOOH) advertising has replaced much of the out-door non-digital advertising (e.g., static billboards). Like its non-digital predecessor, DOOH advertising relies on impressions with consumers that are within a certain visual range of the display. While certain information about the surrounding individuals such as interests, shopping habits, demographics, and the like, may be collected via well-known techniques, it is difficult to aggregate and harness this information for purposes of displaying a DOOH advertisement relevant to the surrounding population. In the same vein, it is difficult to for advertisers to determine the DOOH spaces (e.g., displays) that are positioned in locations with the highest concentration of relevant consumers.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

FIGS. 2A-2C are schematic illustrations of frequency maps of the advertising exchange system, in accordance with one or more example embodiments of the present disclosure.

DETAILED DESCRIPTION

Overview

Figure 1:
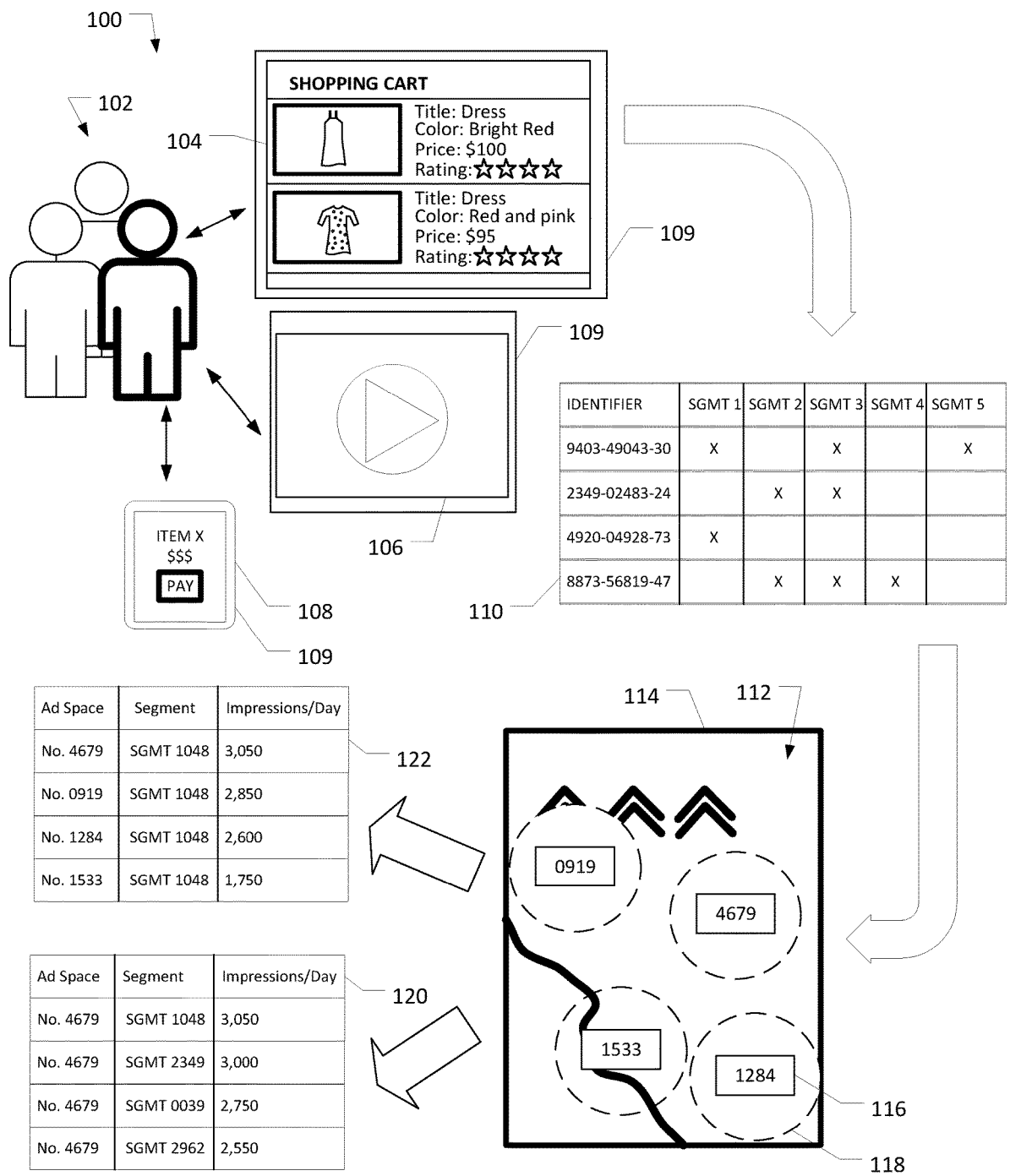
FIG. 1 is a schematic illustration of an example use case showing a digital out of home (DOOH) advertising system, in accordance with one or more example embodiments of the present disclosure.

The systems and methods herein may be used by a digital out of home (DOOH) advertisement system to determine, based on actions and activities of users, certain information and attributes corresponding to each user, determine certain segments of consumers with information and/or attributes in common, determine a network of DOOH spaces (e.g., displays, screens, platforms, etc.), and determine estimated impressions with respect to certain DOOH spaces and segments of consumers based on the proximity of consumers to the DOOH spaces. The DOOH advertisement system may be employed to determine the DOOH spaces with the highest estimated impressions for a given segment or segments. Alternatively, or in addition, the DOOH advertisement system may be employed to determine the segments of consumers with the highest estimated impressions for a given DOOH space.

The DOOH advertising system may determine a database or library of advertising spaces (e.g., DOOH advertising spaces such as displays, screens, platforms, etc.) that each may correspond to a certain location (e.g., latitude and longitude coordinates, GPS coordinates, etc.). For example, publishers on the supply side may provide information about available advertising spaces. Each advertising space may be associated with one or more areas, regions or perimeters based on a zip code, city limits, county limits, state boundaries, and/or any other well-known boundary, limits and/or perimeters. If the location of an advertising space is within the area or perimeter, the advertising space may be associated with that area or perimeter (e.g., in the library of advertising spaces).

The DOOH advertising system may further communicate with a database of user segments. Each segment in the database of user segments may include one or more attributes or parameters that are associated with all individuals (e.g., consumers) included in the segment. For example, one segment may include the attributes and/or descriptors "ages 25-35" and "basketball." In this segment, individuals included in this segment may be associated with the attributes "ages 25-35" and "basketball." This information may be associated with the individual based on certain actions or activities of that individual. For example, the individual may have purchased basketball shoes and may have generated a user profile on which the age 26 was selected. The user profile may also include a shipping address for the individual, providing the individuals location.

Based on an address for each individual in the consumer segments, the general location of each user may be known. The location for each advertisement space may also be known. Using this information, a frequency map may be generated given certain advertising spaces and certain consumer segments. To estimate a number of impressions for a given consumer segment and a given advertising space, a radius centered around a given advertising space may be determined and within that radius it may be assumed that individuals known to be associated with an address in that radius are likely to see the advertisement, or a certain percentage of these individuals will likely see the advertisement. Based on this assumption, an estimated number of impressions for a given advertisement space and a given consumer segment may be determined.

Referring to FIG. 1, an example use case 100 for determining attributes corresponding to consumer activities and/or actions, determining a library of consumer segments corresponding to consumers and their locations (e.g., shipping address), determining a map or inventory of advertising spaces (e.g., screens, displays and/or platforms) each corresponding to a location (e.g., longitude and latitude coordinates), determining an impression radius indicative of a high likelihood of seeing the advertisement (e.g., becoming impressed) for consumers within the radius, and determining a number of impressions for a segment corresponding to a certain advertisement space (e.g., DOOH space). Further, an electronic device (e.g., electronic device 109) may be used to view frequency map 114 for viewing advertising spaces and the presence of consumers in relevant segments, described in more detail below In the illustrated example, an electronic device (e.g., electronic device 109) may communicate (e.g., over the Internet) with a server running one of activities 104, 106 and 108 and/or the DOOH advertising system. It is understood that the server may be one or more servers. The electronic device 109 may be any computing device that may communicate with one or more servers and/or other computing devices via any well-known wired or wireless system (e.g., Wi-Fi, cellular network, Bluetooth, Bluetooth Low Energy (BLE), near field communication protocol, etc.). The electronic device 109 may be any computing device with a processor and may include one or more displays (e.g., touch screen display) and/or one or more speakers (e.g., smart phone or tablet device, desktop computer, laptop computer, e-reader, wearable device, smart speaker, or the like). Computing device 110 may run a local application (e.g., media streaming application, shopping application, payment application) which may communicate with the server running the DOOH advertisement system and otherwise process instructions and/or perform operations based on commands received from the server or servers.

The server may be one or more computing devices (e.g., one or more servers) in communication with the electronic device (e.g., electronic device 109). For example, server 120 may be the same as server 600, described in more detail below with respect to FIG. 6. The server may include one or more servers and/or otherwise communicate with other servers, databases, datastores, and the like. The server may be a computing device with a processor and may run one or more applications and/or platforms (e.g., the DOOH advertisement system). It is understood that, in one example, the electronic device 109 and the server may coordinate to perform one or more of the operations described herein with respect to FIG. 1 or otherwise described herein.

As shown in FIG. 1, the advertisement exchange system may determine certain information from activities and actions of consumers 102. For example, consumers 102 may participate in certain online activities such as shopping activities 104, entertainment activities 106, and/or financial activities 108 (e.g., using electronic device 109). Shopping activities may involve e-commerce related activities, such as browsing products and purchasing select products. The entertainment activities 106 may involve viewing media content via the internet (e.g., streaming shows, movies, music, podcasts, news, etc.). Purchasing activities may involve using a purchasing system to buy certain items at brick and mortar and/or online locations. The activities may require that the consumer enter information about the user such as age, shipping and/or billing address, gender and other well-known information for user-profiles on these types of systems.

Information collected from one or more platforms or systems facilitating these activities may be associated with a specific consumer on a consumer database 110. For example, attributes or information about that consumer or the consumer's preferences or actions may be aggregated and associated with a consumer on the consumer database. In one example, user 102 may be associated with dresses because she purchased dresses, may be associated with category of shows (e.g., romantic comedies) based on history of shows watched on a streaming service, and may be associated with purchases of a certain amount based on purchase history on a financial service.

The various attributes and information determined based on the consumer's online actions and activities may be combined into segments that may be relevant to advertisers. For example, one segment may be "women," "ages 15-35," "romantic comedies." The segment may be populated in the consumer database with consumers having known attributes that conform and/or align with this segment. For example, consumer database 110 may maintain a database of unique consumer identifiers and associate each consumer with a category for which attributes of that given category have been identified for the consumer. As shown in FIG. 1, consumer identifier "9403-49043-30" may be associated with segments 1, 3, and 5. It is understood that the information in the consumer database 110 may be anonymized and/or otherwise protected to prevent the risk of exposure of personal information.

Additionally, the DOOH advertisement system may determine advertisement spaces (e.g., digital billboards, advertisement screens and/or displays, platform displays, etc.) in various territories (e.g., DOOH spaces). It is understood that the terms DOOH spaces and advertising spaces may include indoor, outdoor, public, and/or semi-public, billboards, screens, projections, and/or displays, and the like. Information about advertisement spaces may be received from the supply side and/or publishers and may include information about the type of advertisement space, the size of the advertisement space, relevant formatting information, the location of the advertisement space (e.g., GPS coordinates and/or latitude and longitude coordinates), and any other relevant information about the advertisement space.

Using the information determined about the advertisement spaces, the DOOH advertisement system may determine the relation of the advertisement spaces to the density of the consumers in the area to estimate impressions for each advertisement space. For example, the DOOH advertisement system may generate frequency map 114 which may overlay the advertisement spaces over a map of a given region 112 (e.g., focused on a zip code, county, city, media market, state, country, etc.) and may also include an indication of the number of consumers in a given area on the map, as shown in FIG. 2B. The frequency map 114 in FIG. 1 includes advertisement space 116, for example, and also includes an impression radius 118 which may be indicative of a distance around the advertising space for which the likelihood of an impression for a consumer in the radius is high.

Based on the location of the advertising space (e.g., advertising space 116), a given radius from the advertisement space (e.g., impression radius 118), and the location of consumers with respect to the advertising space and the radius, the information determined about the consumers (e.g., attributes) and the consumer segments may be harnessed to make estimates about a number of impressions for a given advertising space and segment category, the segment category with the highest number of impressions for a given advertising space, and/or the advertising space with the highest number of impressions for a given segment.

As shown in FIG. 1, each advertising space (e.g., display) in a region (e.g., region 112) may be identified. In one example, the region may be a city and may be determined based on city limits and/or borders. A segment of interest to an advertiser (e.g., segment 1048) may be identified (e.g., by an advertiser). For example, a basketball shoe company may select a segment that includes attributes such as "ages 15-35" and "basketball events" indicating that the consumers in this category are between the ages 15-35 and have watched basketball events on a live streaming service. The DOOH advertisement system and/or advertiser may determine a radius around the advertisement spaces indicative of a high likelihood of impressions for the consumers located in the radius.

For each segment, the DOOH advertisement system may determine a number of impressions (e.g., per day) for each advertisement space in this region and may rank the advertisement spaces according to the highest estimated impressions for that segment. For example, the DOOH advertisement system may generate an impressions table 122 which may list advertisement space number 4679 as having the highest number of estimated impressions per day for segment 1048. In addition and/or alternatively, this same information may be illustrated on a map, which may be an interactive map and may illustrate the number of impressions for each advertisement display, for example.

Similarly, a given advertisement space of interest may be selected (e.g., a specific digital billboard) for analysis. For this particular advertisement space, the DOOH advertisement system may estimate the number of impressions for a given time (e.g., impressions per day) for each segment in the database and may determine the segments with the highest estimated impressions for the given time. As shown in FIG. 1, impressions table 120 may include estimated impressions for advertisement space 4679. In this example, segment 1048 may have an estimated 3,050 impressions per day for advertisement space 4679 which may exceed the estimated impressions for all other segments. Segment 1048 may correspond to "ages 15-35" and "basketball events" and thus impressions table 120 may indicated that advertisement space 1048 may be of great importance to a basketball shoe company.

In another example, display 114 may include a route for a moving advertisement (e.g., DOOH space configured on a vehicle, e.g., bus, semi-truck, aircraft, or otherwise configured to move). In this manner, display 114 may illustrate various locations of the moving advertisement space along a route and may estimate impressions for each location along the route. For example, display 114 may illustrate four locations along a route for a moving DOOH space. It is understood that a fewer or greater amount of locations along the route may be displayed, analyzed and/or identified. This approach may be used to determine the locations along a route that are most relevant to certain consumer segments (e.g., the locations with the highest estimated impressions along the route). Based on this information, the moving DOOH space may alternate between advertisements depending on the location (e.g., zip code) of the moving DOOH space and the segments determined to be most relevant (e.g., having the highest estimated impressions) for that location may be displayed in that location.

Illustrative Process and Use Cases

FIGS. 2A-2C are schematic illustrations of an example process for determining a frequency map. The process illustrated in FIGS. 2A-2C may be performed by the DOOH advertisement system. Referring to FIG. 2A, the location for each advertising space (e.g., DOOH space) in a certain region may be identified to position each advertising space on an advertising space map 202. For example, for each advertising space (e.g., advertising space 214), certain coordinates may be determined. In one example, longitude and latitude coordinates for the advertising space may be determined. The longitude and latitude coordinates may align with certain coordinates on longitude 208 and latitude 210 lines on map 202. Map 202 may further include topographical information 212 (e.g., mountains and/or oceans) for context.

Referring now to FIG. 2B, a consumer location map 204 may be determined for the same region identified with respect to FIG. 2A. For each consumer 216, a corresponding location may be determined (e.g., based on information in consumer database). In one example, the consumer location may be based on a shipping address. Each consumer may be positioned on the map (e.g., corresponding to the longitude and latitude points corresponding to the shipping address). In this manner, the positioning and/or density of consumers may be determined with respect to the advertising spaces. Specifically, the consumer location map 204 may be used to determine that advertising space 215 is located in a densely populated area of the region.

Referring now to FIG. 2C, frequency map 206 is illustrated. Frequency map 206 may be determined by determining an impression radius 222 indicative of a high likelihood of impressions for consumers located within the radius. It is understood that frequency map 206 may be designed to only show the advertisement spaces corresponding to the highest estimated impressions. In the example shown in FIG. 2C, the three advertisement spaces shown may correspond to the highest estimated impressions of all advertisement spaces in the region. It is further understood that the frequency map may be color coded or may otherwise visually indicate the advertisement space with the greatest number of impressions. For example, the area in each impression radius may be filled with a color and the fewer the number of estimated impressions the more transparent the color may be and the greater the number of estimated impressions, the less transparent the color may be. In one example, if advertisement space 218 corresponded to the highest number of estimated impressions, the area within the corresponding radius may be the least transparent.

Figure 3A:
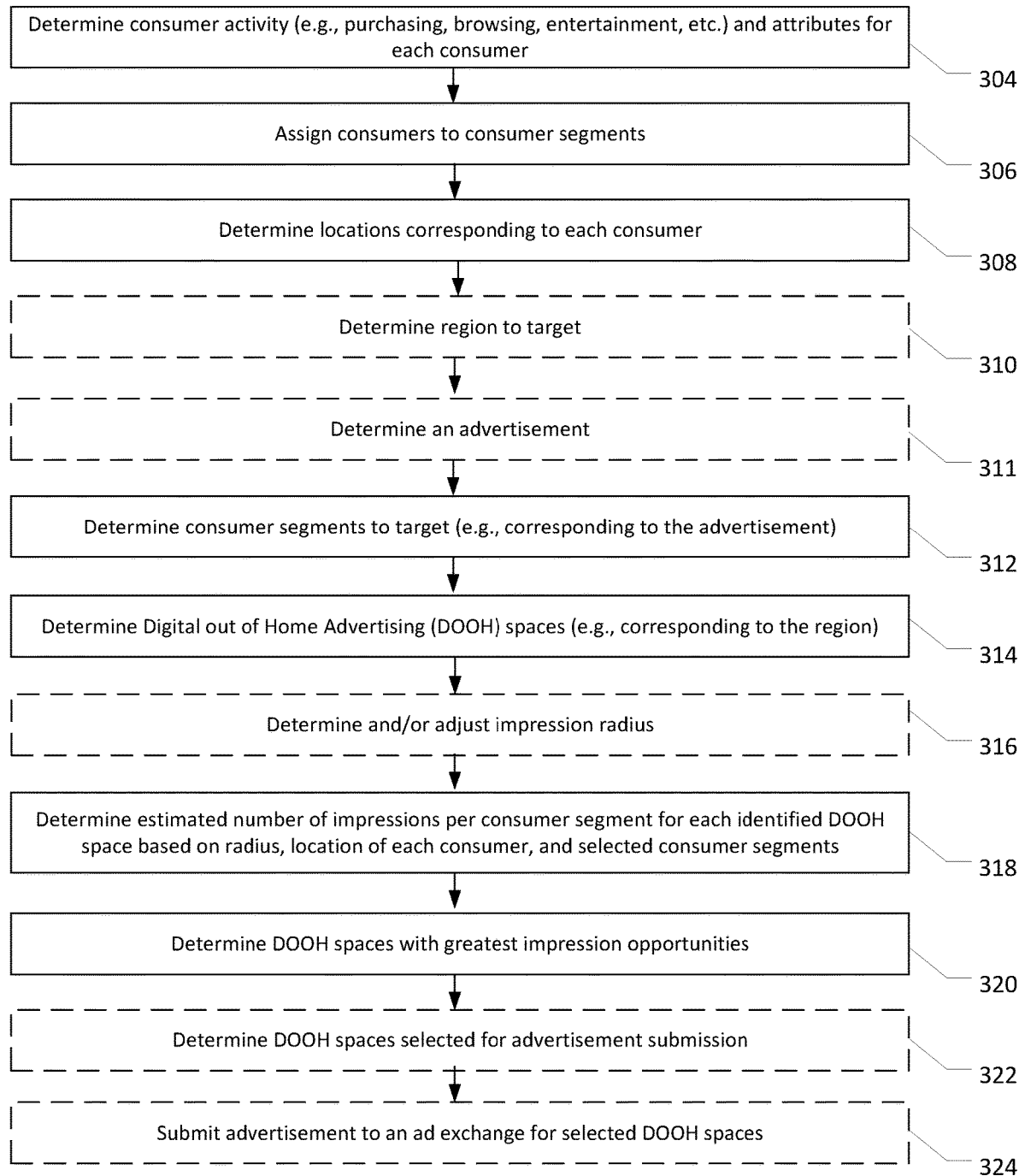
FIGS. 3A-3B are schematic illustrations of example process flows for determining most relevant DOOH spaces and segments, in accordance with one or more example embodiments of the present disclosure.
Figure 3B:
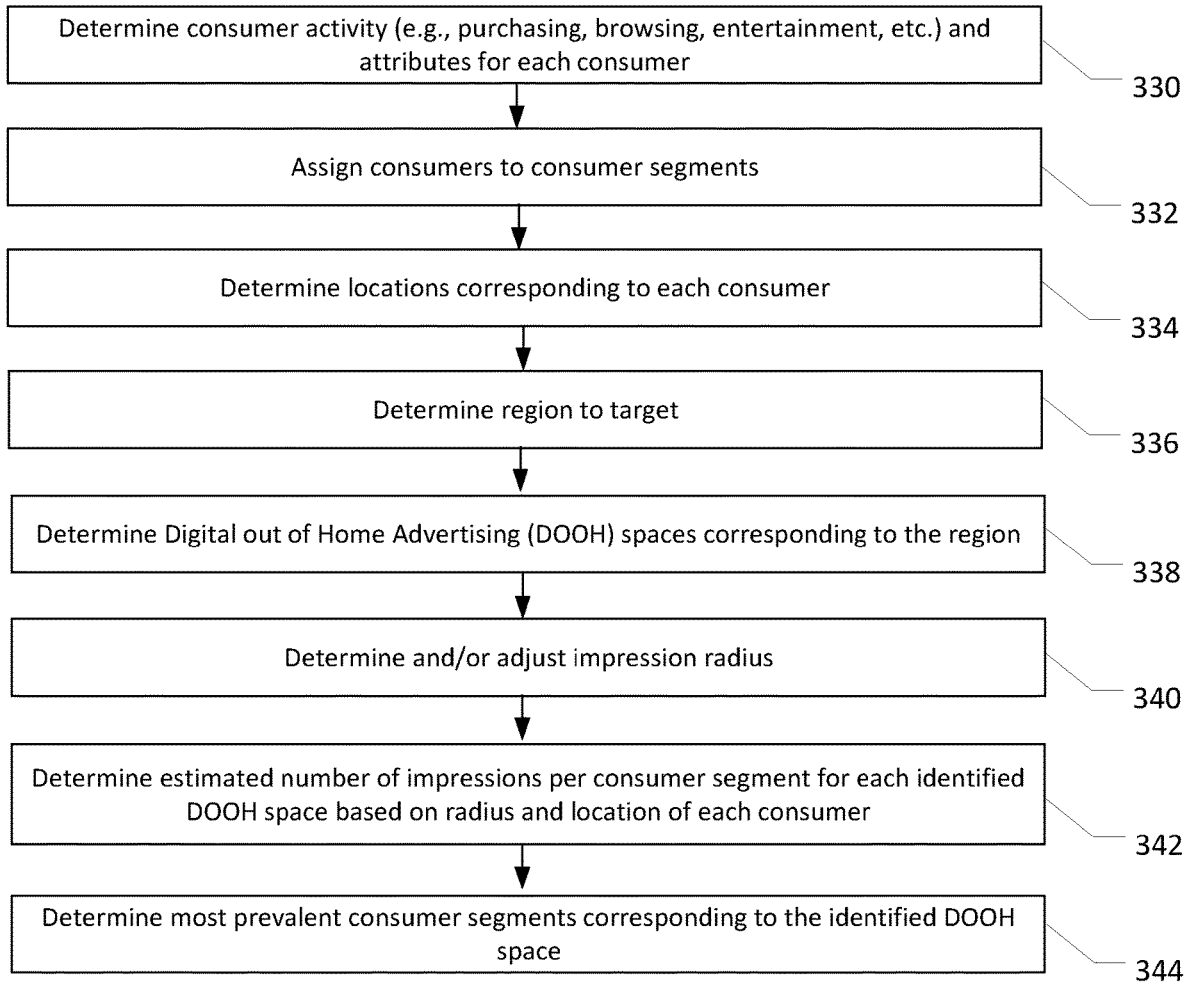

FIGS. 3A-3B depicts example process flows for determining consumer attributes, consumer segments, relevant DOOH spaces, and an estimated number of impressions and harnessing the foregoing information to make impactful advertisement decisions. Some or all of the blocks of the process flows in this disclosure may be performed in a distributed manner across any number of devices (e.g., servers and computing devices), in accordance with one or more example embodiments of the disclosure. Some or are all of the operations of the process flows may be optional and may be performed in a different order.

Referring now to FIG. 3A, an exemplary process flow for determining DOOH spaces with the greatest impression opportunities for a given consumer segment is illustrated, in accordance with one or more example embodiments of the disclosure. At block 304, computer-executable instructions stored on a memory of a device, such as a server, may be executed to determine certain consumer activities and determine attributes based on the consumer activities or behaviors related thereto. For example, consumer activities may involve purchasing activity, browsing activity, and/or entertainment activity. In one example, purchasing activity may involve e-commerce purchases associated with a user account, browsing activity may involve search engine activity related to a user account, and entertainment activity may involve streaming activity, such as television, movie, music and/or podcast streaming. This information may be shared from one or more applications performing these services.

Based on the consumer activity and/or account information corresponding to the consumer activity, certain attributes for each consumer may be determined as well as other consumer information. For example, from user account information, the consumers shipping address may be determined along with other information about the consumer such as age and gender, for example. Other information corresponding to the consumer activity may be determined such as information about the type of media content streamed (e.g., genre of shows, type of music listened to), the type of searches entered in a search engine (e.g., searches about cars, colleges, vacations, etc.), and/or the type of items purchased (e.g., dresses, basketball shoes, cooking utensils, fishing rod, etc.). From this information certain attributes may be associated with the consumer (e.g., interested in fishing, fashion, sports, cars, country music, etc.).

At block 306, computer-executable instructions stored on a memory of a device, such as a server, may be executed to assign consumers to consumer segments. Upon determining which attributes are associated with each consumer, consumers may be associated with consumer segments based on the attributes. Each consumer segment may correspond to multiple attributes. For example, one consumer segment may correspond to "football events" and "ages 50-60." Consumers having these attributes may be associated with this consumer segment. It is understood that there may be thousands of consumer segments and there is no limit to the number of segments each consumer is associated with. It is further understood that certain consumer segments may be more relevant to a given advertisement than others. For example, an advertisement for basketball shoes may be relevant to a consumer segment including the attributes "basketball events" and "ages 15-35."

At block 308, computer-executable instructions stored on a memory of a device, such as a server, may be executed to determine locations corresponding to each consumer. In one example, the location of each consumer may be determined by a shipping address associated with a user account (e.g., on an e-commerce service). Alternatively, a residence address may be determined (e.g., from a user account) or any other address associated with a consumer (e.g., billing address). Alternatively, geolocation information (e.g., from a mobile device) may be used to determine the location of a consumer. It is understood that the DOOH advertising system may be designed to follow certain privacy laws and regulations with respect to the location of the user.

At optional block 310, computer-executable instructions stored on a memory of a device, such as a server, may be executed to determine a region to target and/or focus on. For example, a region may be a city, zip code, town, county, boundary, media market, state, country, or the like. In one example, an advertiser may be interested in advertising in a certain city, and thus, the region may be the city limits for that city or a boundary indicative of a media market that crosses more than one city and/or county. It is understood that to search all advertising spaces in a database, a region may not be selected. This strategy may be employed to determine advertising spaces in the database that are most relevant to a particular consumer segment.

At optional block 311, computer-executable instructions stored on a memory of a device, such as a server, may be executed to determine an advertisement. For example, an advertiser may identify a particular advertisement of interest that it would like to publish on one or more DOOH spaces (e.g., in the region). It is understood that the DOOH advertising system may alternatively be used to determine attribute segments with the most estimated impressions for certain advertising spaces (e.g., similar to the process described with respect to FIG. 3B), and this approach does not involve determining an advertisement.

At block 312, computer-executable instructions stored on a memory of a device, such as a server, may be executed to determine consumer segments to target or focus on. This determination may be based on an advertisement. For an example, an advertiser may select from a library or database of available consumer segments, the consumer segments that are most relevant to the advertisement. Alternatively, the library or database of consumer segments may be associated with certain advertisement types and the DOOH advertising system may suggest certain segments based on the advertisement type or content in the advertisement. In one example, an advertisement for basketball shoes may be relevant to a consumer segment with attributes "basketball events" and "shoes purchased," for example. This segment may include consumers that watched basketball media content and also purchased shoes.

At block 314, computer-executable instructions stored on a memory of a device, such as a server, may be executed to determine digital out of home advertising (DOOH) spaces (e.g., that correspond to the region). As explained above, the DOOH advertising system may include a database of DOOH spaces that may further include information about each DOOH space including the location of the DOOH space. Based on the selected region, the digital out of home advertising (DOOH) spaces located in that region may be determined.

At optional block 316, computer-executable instructions stored on a memory of a device, such as a server, may be executed to determine and/or adjust an impression radius. The impression radius may correspond to a radius surrounding a DOOH space for which consumers located in the radius have a high likelihood of being impressed by the DOOH space. It is understood that a default radius value may be used. Alternatively, or additionally, the radius may be adjusted based on the distance calculation used (e.g., Manhattan distance or Euclidian distance). It is understood that any other well-known distance measurements may be employed. It is also understood that a user may adjust the impression radius. It is further understood that the an impression radius may be adjusted on a per advertisement space basis such that one advertisement space may have an impressions radius different than another advertisement space.

At block 318, computer-executable instructions stored on a memory of a device, such as a server, may be executed to determine an estimated number of impressions for one or more DOOH spaces in the region. The estimated impressions may be specific to one or more consumer segments selected. In one example, a DOOH space may be selected by a user. In another example, all DOOH spaces in a region may be analyzed. In one example, if the consumer is located in the radius, one impression may be estimated for that consumer. The estimated number of impressions may be based on the impression radius, the location of each consumer, and the selected consumer segments.

At block 320, computer-executable instructions stored on a memory of a device, such as a server, may be executed to determine the DOOH spaces with the greatest impression opportunities. For example, for a given targeted consumer segment, the DOOH space in the region with the highest number of estimated impressions may be determined. In another example, a list of the DOOH spaces with the highest number of impressions, ranked by the number of impressions, may be determined.

At optional block 322, computer-executable instructions stored on a memory of a device, such as a server, may be executed to determine one or more DOOH spaces from the DOOH spaces with the highest impression opportunities for advertisement submission. It is understood that these DOOH spaces may correspond to the DOOH advertisement spaces with the best opportunity of impressing the greatest number of consumers. At optional block 324, the computer-executable instructions stored on a memory of a device, such as a server, may be executed to submit the selected advertisement to an advertisement exchange corresponding to the selected DOOH spaces.

Referring now to FIG. 3B, an exemplary process flow for determining consumer segments that are most relevant to a given DOOH space is illustrated, in accordance with one or more example embodiments of the disclosure. At block 330, computer-executable instructions stored on a memory of a device, such as a server, may be executed to determine consumer activity (e.g., corresponding to purchasing, browsing, entertainment, etc.) and certain attributes for each consumer based on the consumer activity and/or information corresponding to user profiles associated with such consumer activity. It is understood that block 330 may be the same as block 304.

At block 332, computer-executable instructions stored on a memory of a device, such as a server, may be executed to assign each consumer to a consumer segment based on certain attributes identified based on the consumer activity and/or the information corresponding to the user profiles. At block 334, computer-executable instructions stored on a memory of a device, such as a server, may be executed to determine locations corresponding to each consumer (e.g., based on shipping information in user profiles). At block 336, computer-executable instructions stored on a memory of a device, such as a server, may be executed to determine a region to target or focus on. It is understood that blocks 332, 334, and 336 may be the same as blocks 306, 308, and 310 respectively.

At block 338, computer-executable instructions stored on a memory of a device, such as a server, may be executed to determine digital out of home advertising spaces corresponding to the region. It is understood that a user of the DOOH advertising system may select certain of the DOOH spaces in the region to narrow the analysis. At optional block 340, computer-executable instructions stored on a memory of a device, such as a server, may be executed to determine an impression radius. It is understood that blocks 338 and 340 may be the same as blocks 314 and 316, respectively.

At block 342, computer-executable instructions stored on a memory of a device, such as a server, may be executed to determine an estimated number of impressions for each identified and/or selected DOOH space in the region. An estimated number of impressions may be determined for every consumer segment in the consumer segment database and/or library. The estimated impressions may be based on the radius of impressions and may be adjusted as the radius of impressions is adjusted. At block 344, computer-executable instructions stored on a memory of a device, such as a server, may be executed to determine the consumer segments corresponding to the highest number of estimated impressions and arranged in order of highest number of estimated impressions.

Figure 4A:
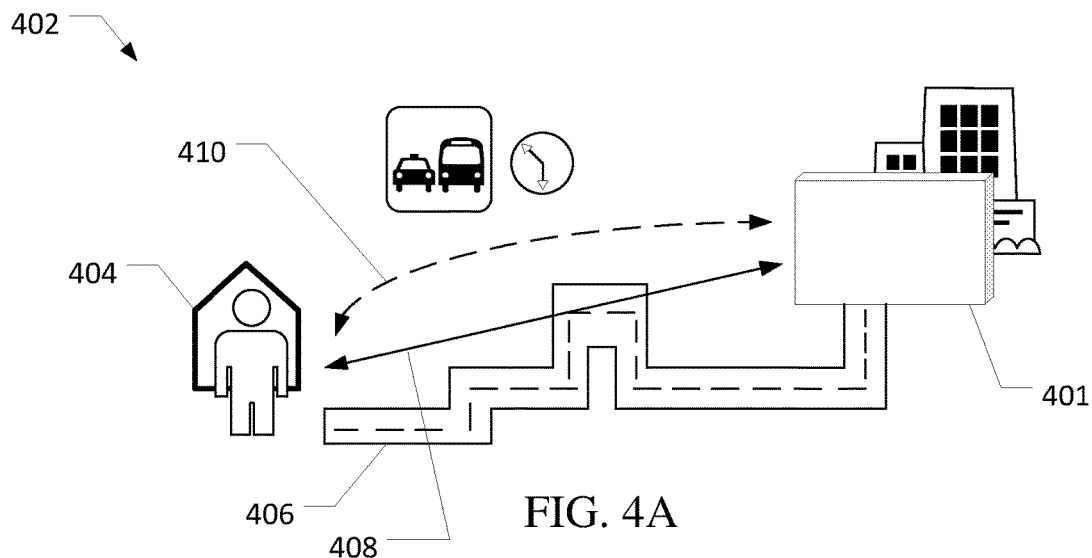
FIGS. 4A-4C are schematic illustrations of types of distances for determining a distance between a consumer and an advertising space, in accordance with one or more example embodiments of the present disclosure.
Figure 4B:
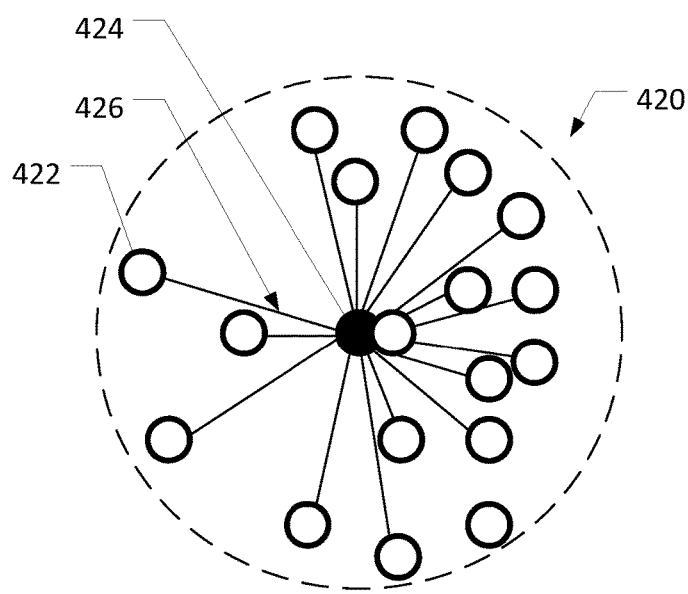
Figure 4C:
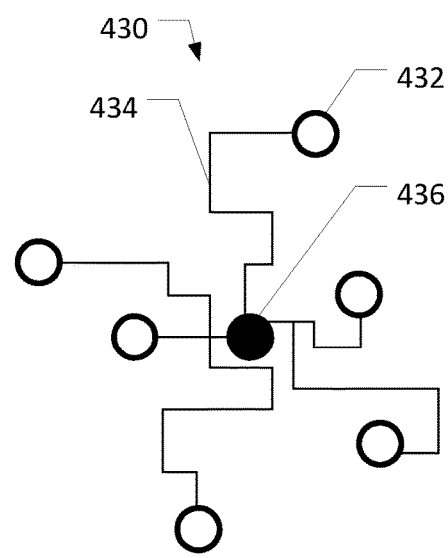

FIGS. 4A-4C depict schematic diagrams illustrating the distance between consumers and an advertising space (e.g., DOOH space), in accordance with one or more example embodiments of the disclosure. Referring now to FIG. 4A, three types of distances 402 are illustrated between consumer 404 and advertising space 401. As shown in FIG. 4A, consumer 404 may be located at the consumer's shipping address (e.g., consumer's home) and the advertising space may be located some distance away (e.g., on a city street corner).

The distance between consumer 404 and advertising space 401 may be calculated using a number of well-known techniques that may result in different distance values. For example, Euclidian distance 408 may employ a Euclidian distance calculation to determine the distance between coordinates corresponding to the consumer's location and coordinates corresponding to the advertising space 401 (e.g., calculated from the coordinates of the points using the Pythagorean theorem). Alternatively, the distance between the consumer and the advertising space may be the Manhattan distance 406, which is calculated to account for the distance along a street or other path between the consumer's location and the advertising space location. Alternatively, a travel distance 410 may consider the time it takes to get from the consumer's location to the advertising space location, which may take into account traffic and other obstacles (e.g., tolls).

Referring now to FIG. 4B, a radius of impressions 420 is illustrated using Euclidian distance 426 for each distance between the advertising space 424 and a corresponding consumer location (e.g., consumer location 422). While the Euclidian distance is less complex than the Manhattan distance, it may lack certain information that may be relevant to an estimate of impressions. For example, if there are natural or manmade obstructions (e.g., extreme elevation changes) a seemingly nearby consumer may have a low likelihood of impression. In another example, the design of streets (e.g., one-way streets) or public transportation may make an impression unlikely despite a consumer having a location that is relatively close in proximity to the advertising space.

Referring now to FIG. 4C, the Manhattan distance (e.g., Manhattan distance 434) is illustrated for several consumer locations (e.g., consumer 432) with respect to an advertising space (e.g., advertising space 436). Unlike the Euclidian distance, the Manhattan distance may account for street or public transportation designs. As streets and public transportation typically avoids natural or manmade obstructions, the Manhattan distance may inherently account for such obstructions. Accordingly, the Manhattan distance may offer increased accuracy with respect to the estimated impressions.

Figure 5:
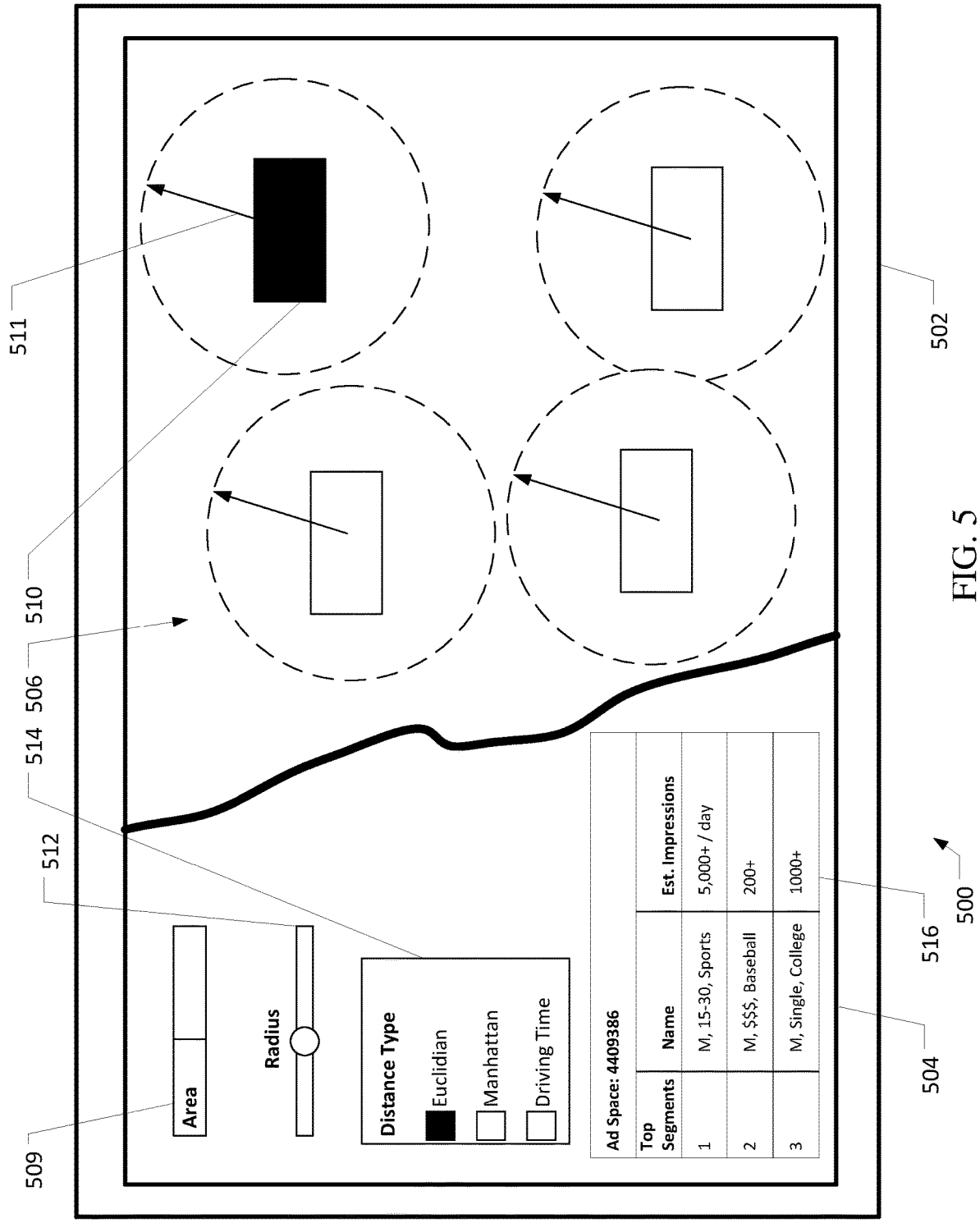
FIG. 5 is schematic illustrations of an exemplary user interface for determining the most relevant DOOH spaces, in accordance with one or more example embodiments of the present disclosure.

FIG. 5 depicts a schematic illustration 500 of an exemplary user interface for the DOOH advertising system. User interface 504 may run on electronic device 502, which may be the same as electronic device 109. Interface 504 may be used by a user, such as an advertiser to make certain selections using the DOOH advertising system and otherwise analyze DOOH spaces with respect to estimated impressions. In one example, a user such as an advertiser may view available DOOH spaces, make selections with respect to the impression radius and/or distance calculation used, and/or view consumer segments relevant to the DOOH spaces shown and/or estimation impressions.

As shown in FIG. 5, interface 504 may include area input 509, radius adjuster 512, distance selector 514, impression output 516, frequency map 506 including DOOH spaces 510 and/or impressions radius 511. Area input 509 may be used to enter area specific information to narrow analysis to a specific region. For example, a city name, county name, or zip code may be input into area input 509 to focus map 506 on a specific area and/or region and thus focus on the advertising spaces in that area. It is further understood that a user may zoom in and out and/or click and drag the map 506 to focus the DOOH advertising system on nearby regions.

Radius adjuster 512 may be used to increase the impression radius 511 surrounding the DOOH spaces. It is understood that radius adjuster may begin with a default value that may be adjusted by the user. In another example, the impression radius may be determined by the DOOH advertising system and may not be adjusted by the user. Distance selector 514 may optionally be included to display various distance types to choose from to calculate the distance between a given advertising space (e.g., DOOH space) and the location of surrounding consumers. For example, distance selector 514 may include various distance calculation methods such as Euclidian distance, Manhattan distance and/or driving distance, which may account for time of travel. In one example, the distance type may be set to a default type (e.g., Euclidian).

Impression output 516 may include one more table that lists the estimated impressions for one or more advertising spaces. For example, the impression output 516 illustrated in FIG. 5 may list the consumer segments for the selected advertising spaces having the highest number of estimated impressions. In the illustrated example, the impressions output 516 may include the name and/or attributes in each segment (e.g., Male, ages 15-30, Sports), and may further include the number of estimated impressions (e.g., per day). For example, the first segment listed may correspond to an impression estimate of 5,000 per day.

The impression output 516 may correspond to a selected advertising space. For example, DOOH space 510 may be selected. Clicking on a different advertising space may populate a new impression output 516 specific to the newly selected advertising space. It is further understood that modifying the radius adjuster 512 or distance selector 514 may adjust the estimate impressions in real time or near real time and may cause different segments to appear in the list as the consumer segments corresponding to the highest impressions may change.

While impression output 516 illustrated in FIG. 5 includes a list of consumer segments corresponding to the highest estimated impressions for a given advertising space, it is understood that interface 516 may be used to determine the advertising space corresponding to the highest estimated impressions for a given segment. For example, interface 504 may display an impression output that lists the advertising spaces in the region ranked according to the highest impression estimates for a given segment.

Illustrative Device Architecture

Figure 6:
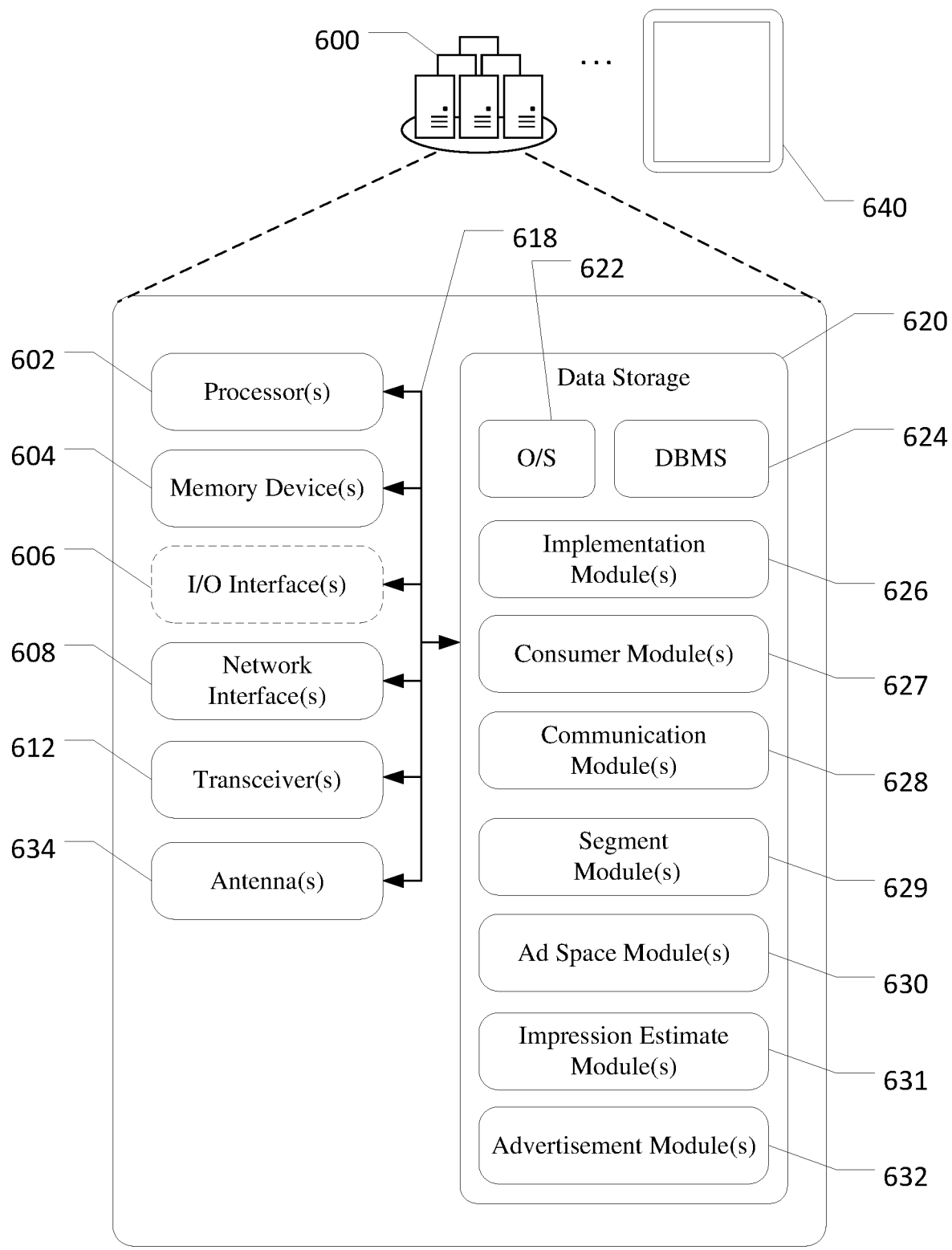
FIG. 6 is a schematic block diagram of a server in accordance with one or more example embodiments of the disclosure.

FIG. 6 is a schematic block diagram of an illustrative sever 600 in accordance with one or more example embodiments of the disclosure. The server 600 may be one or more servers and may include any suitable computing device capable of receiving and/or sending data, and may optionally be coupled to devices including, but not limited to, electronic devices such as a connected device, smartphone, tablet, smart television, e-reader, one or more user devices (e.g., wearable devices and/or smart sensors), a desktop computer, a laptop computer, one or more servers, datastores, or the like. The server 600 may correspond to an illustrative device configuration for any servers of FIGS. 1-5. Server 600 may run the DOOH advertising system. Electronic device 640 may correspond to electronic device 109 and/or and any other electronic device of FIGS. 1-5.

The server 600 may be configured to communicate via one or more networks with one or more servers, electronic devices, user devices, or the like. Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the server 600 may include one or more processors (processor(s)) 602, one or more memory devices 604 (generically referred to herein as memory 604), one or more of the optional input/output (I/O) interface(s) 606, one or more network interface(s) 608, one or more transceivers 612, and one or more antenna(s) 634. The server 600 may further include one or more buses 618 that functionally couple various components of the server 600. The server 600 may further include one or more antenna(e) 634 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals including BLE signals, a Near Field Communication (NFC) antenna for transmitting or receiving NFC signals, a 900 MHz antenna, and so forth. These various components will be described in more detail hereinafter.

The bus(es) 618 may include at least one of a system bus, a memory bus, an address bus, or a message bus, and may permit exchange of information (e.g., data (including computer-executable code), signaling, etc.) between various components of the server 600. The bus(es) 618 may include, without limitation, a memory bus or a memory controller, a peripheral bus, an accelerated graphics port, and so forth. The bus(es) 618 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 604 of the server 600 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 604 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 620 may include removable storage and/or non-removable storage including, but not limited to, magnetic storage, optical disk storage, and/or tape storage. The data storage 620 may provide non-volatile storage of computer-executable instructions and other data. The memory 604 and the data storage 620, removable and/or non-removable, are examples of computer-readable storage media (CRSM) as that term is used herein.

The data storage 620 may store computer-executable code, instructions, or the like that may be loadable into the memory 604 and executable by the processor(s) 602 to cause the processor(s) 602 to perform or initiate various operations. The data storage 620 may additionally store data that may be copied to memory 604 for use by the processor(s) 602 during the execution of the computer-executable instructions. Moreover, output data generated as a result of execution of the computer-executable instructions by the processor(s) 602 may be stored initially in memory 604, and may ultimately be copied to data storage 620 for non-volatile storage.

More specifically, the data storage 620 may store one or more operating systems (O/S) 622; one or more database management systems (DBMS) 624; and one or more program module(s), applications, engines, computer-executable code, scripts, or the like such as, for example, one or more implementation module(s) 626, one or more consumer module(s) 627, one or more communication module(s) 628, one or more segment module(s) 629, one or more advertising space module(s) 630, one or more impression estimate module(s) 631 and/or one or advertisement module(s) 632. Some or all of these module(s) may be sub-module(s). Any of the components depicted as being stored in data storage 620 may include any combination of software, firmware, and/or hardware. The software and/or firmware may include computer-executable code, instructions, or the like that may be loaded into the memory 604 for execution by one or more of the processor(s) 602. Any of the components depicted as being stored in data storage 620 may support functionality described in reference to correspondingly named components earlier in this disclosure.

The data storage 620 may further store various types of data utilized by components of the server 600. Any data stored in the data storage 620 may be loaded into the memory 604 for use by the processor(s) 602 in executing computer-executable code. In addition, any data depicted as being stored in the data storage 620 may potentially be stored in one or more datastore(s) and may be accessed via the DBMS 624 and loaded in the memory 604 for use by the processor(s) 602 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 6, the datastore(s) may include, for example, user preference information, user contact data, device pairing information, and other information.

The processor(s) 602 may be configured to access the memory 604 and execute computer-executable instructions loaded therein. For example, the processor(s) 602 may be configured to execute computer-executable instructions of the various program module(s), applications, engines, or the like of the server 600 to cause or facilitate various operations to be performed in accordance with one or more embodiments of the disclosure. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), an application-specific integrated circuit, a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to functionality supported by the various program module(s) depicted in FIG. 6, the implementation module(s) 626 may include computer-executable instructions, code, or the like that are responsive to execution by one or more of the processor(s) 602 may perform functions including, but not limited to, overseeing coordination and interaction between one or more modules and computer executable instructions in data storage 620. Implementation module 626 may further coordinate with communication module 628 to send messages to and receive messages from electronic device 640, a server running one or more services that a consumer is accessing (e.g., a streaming service, e-commerce service, financial or purchasing service) and/or an advertisement exchange.

The consumer module(s) 627 may include computer-executable instructions, code, or the like that are responsive to execution by one or more of the processor(s) 602 may perform functions including, but not limited to, determining consumer information (e.g., attributes and other information about consumers such as shipping address). This information may be received from or determined by one or more services that a consumer is accessing (e.g., a streaming service, e-commerce service, financial or purchasing service) and/or may be processed by consumer module(s) 627 to determine additional information such as attribute information. The consumer module 627 may maintain a library or database of consumers and associate certain information such as applicable attributes and location with each user.

The communication module(s) 628 may include computer-executable instructions, code, or the like that responsive to execution by one or more of the processor(s) 602 may perform functions including, but not limited to, communicating with one or more devices or servers, for example, via wired or wireless communication, communicating with electronic devices, communicating with one or more servers (e.g., remote servers), communicating with remote datastores and/or databases, sending or receiving notifications or commands/directives, communicating with cache memory data, and the like.

The segment module(s) 629 may include computer-executable instructions, code, or the like that are responsive to execution by one or more of the processor(s) 602 may perform functions including, but not limited to, maintaining a library or database of consumer segments. Each consumer segment may correspond to one or more consumer attributes. In one example, the consumer module may associate each consumer segment with consumers corresponding to attributes relevant to each consumer segment.

The advertising space module(s) 630 may include computer-executable instructions, code, or the like that are responsive to execution by one or more of the processor(s) 602 may perform functions including, but not limited to, maintaining a library and/or database of advertisement spaces (e.g., DOOH spaces) including the location of such spaces (e.g., coordinates) as well as other relevant information such as size and formatting information. In one example, the DOOH advertising system may receive this information from advertising publishers (e.g., owners and/or managers).

The impression estimate module(s) 631 may include computer-executable instructions, code, or the like that are responsive to execution by one or more of the processor(s) 602 may perform functions including, but not limited to, determining an estimate of impressions for advertisement spaces (e.g., DOOH spaces) for one or more consumer segments. This determination may be based on the advertising space location and the location of one or more consumers associated with a given segment and/or in the radius of impressions.

The advertisement module(s) 632 may include computer-executable instructions, code, or the like that are responsive to execution by one or more of the processor(s) 602 may perform functions including, but not limited to, maintaining a library and/or database of advertisement information (e.g., advertisement media and/or relation information). The advertisement information may be uploaded or otherwise communicated from advertisers and may include the advertisement itself and/or information about the advertisement.

Referring now to other illustrative components depicted as being stored in the data storage 620, the O/S 622 may be loaded from the data storage 620 into the memory 604 and may provide an interface between other application software executing on the server 600 and hardware resources of the server 600. More specifically, the O/S 622 may include a set of computer-executable instructions for managing hardware resources of the server 600 and for providing common services to other application programs (e.g., managing memory allocation among various application programs). In certain example embodiments, the O/S 622 may control execution of the other program module(s) for content rendering. The O/S 622 may include any operating system now known or which may be developed in the future including, but not limited to, any server operating system, any mainframe operating system, or any other proprietary or non-proprietary operating system.

The DBMS 624 may be loaded into the memory 604 and may support functionality for accessing, retrieving, storing, and/or manipulating data stored in the memory 604 and/or data stored in the data storage 620. The DBMS 624 may use any of a variety of database models (e.g., relational model, object model, etc.) and may support any of a variety of query languages. The DBMS 624 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like.

Referring now to other illustrative components of the server 600, the optional input/output (I/O) interface(s) 606 may facilitate the receipt of input information by the server 600 from one or more I/O devices as well as the output of information from the server 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the server 600 or may be separate. The I/O devices may further include, for example, any number of peripheral devices such as data storage devices, printing devices, and so forth.

The optional I/O interface(s) 606 may also include an interface for an external peripheral device connection such as universal serial bus (USB), FireWire, Thunderbolt, Ethernet port or other connection protocol that may connect to one or more networks. The optional I/O interface(s) 606 may also include a connection to one or more of the antenna(e) 634 to connect to one or more networks via a wireless local area network (WLAN) (such as Wi-Fi®) radio, Bluetooth, ZigBee, and/or a wireless network radio, such as a radio capable of communication with a wireless communication network such as a Long Term Evolution (LTE) network, WiMAX network, 3G network, ZigBee network, etc.

The server 600 may further include one or more network interface(s) 608 via which the server 600 may communicate with any of a variety of other systems, platforms, networks, devices, and so forth. The network interface(s) 608 may enable communication, for example, with one or more wireless routers, one or more host servers, one or more web servers, and the like via one or more of networks.

The antenna(e) 634 may include any suitable type of antenna depending, for example, on the communications protocols used to transmit or receive signals via the antenna(e) 634. Non-limiting examples of suitable antennas may include directional antennas, non-directional antennas, dipole antennas, folded dipole antennas, patch antennas, multiple-input multiple-output (MIMO) antennas, or the like. The antenna(e) 634 may be communicatively coupled to one or more transceivers 612 or radio components to which or from which signals may be transmitted or received.

As previously described, the antenna(e) 634 may include a Bluetooth antenna configured to transmit or receive signals in accordance with established standards and protocols, such as Bluetooth and/or BLE. Alternatively, or in addition to, antenna(e) 634 may include cellular antenna configured to transmit or receive signals in accordance with established standards and protocols, such as or cellular antenna configured to transmit or receive signals in accordance with established standards and protocols, such as Global System for Mobile Communications (GSM), 3 G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like. The antenna(e) 634 may additionally, or alternatively, include a Wi-Fi® antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 634 may be configured to transmit or receive radio frequency signals within any suitable frequency range forming part of the unlicensed portion of the radio spectrum (e.g., 900 MHz).

The antenna(e) 634 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 612 may include any suitable radio component(s) for—in cooperation with the antenna(e) 634—transmitting or receiving radio frequency (RF) signals in the bandwidth and/or channels corresponding to the communications protocols utilized by the server 600 to communicate with other devices. The transceiver(s) 612 may include hardware, software, and/or firmware for modulating, transmitting, or receiving—potentially in cooperation with any of antenna(e) 634— communications signals according to any of the communications protocols discussed above including, but not limited to, one or more Wi-Fi® and/or Wi-Fi® direct protocols, as standardized by the IEEE 802.11 standards, one or more non-Wi-Fi® protocols, or one or more cellular communications protocols or standards. The transceiver(s) 612 may further include hardware, firmware, or software for receiving GNSS signals. The transceiver(s) 612 may include any known receiver and baseband suitable for communicating via the communications protocols utilized by the server 600. The transceiver(s) 612 may further include a low noise amplifier (LNA), additional signal amplifiers, an analog-to-digital (A/D) converter, one or more buffers, a digital baseband, or the like.

It should be appreciated that the program module(s), applications, computer-executable instructions, code, or the like depicted in FIG. 6 as being stored in the data storage 620 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the server 600 and/or hosted on other computing device(s) accessible via one or more networks, may be provided to support functionality provided by the program module(s), applications, or computer-executable code depicted in FIG. 6 and/or additional or alternate functionality. Further, functionality may be modularized differently such that processing described as being supported collectively by the collection of program module(s) depicted in FIG. 6 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 6 may be implemented, at least partially, in hardware and/or firmware across any number of devices.

It should further be appreciated that the server 600 may include alternate and/or additional hardware, software, or firmware components beyond those described or depicted without departing from the scope of the disclosure. More particularly, it should be appreciated that software, firmware, or hardware components depicted as forming part of the server 600 are merely illustrative and that some components may not be present or additional components may be provided in various embodiments. While various illustrative program module(s) have been depicted and described as software module(s) stored in data storage 620, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
    presenting a user interface, wherein the user interface comprises:
        a first user interface element allowing a user to select from a plurality of selectable radii;
        a second user interface element allowing the user to select from a plurality of selectable distance types that includes one or more of Euclidian distance, driving distance or Manhattan distance;
        a third user interface element allowing the user to select one or more selectable digital out of home (DOOH) spaces from a plurality of selectable DOOH spaces; and
        a fourth user interface element, determined based at least in part from the first user interface element, the second user interface element, and the third user interface element;
    determining a first advertising space and a second advertising space in a first area, wherein the first advertising space is a first DOOH space of the plurality of selectable DOOH spaces, wherein the first area is based on a first radius and a first distance type;
    responsive to a selection of the first advertising space, the first radius, and the first distance type using the user interface:
        determining a first segment of consumers having one or more common attributes, a first attribute of the one or more common attributes being respective shipping addresses associated with online shopping activity and within the first area;

determining a first real-time estimate of impressions by consumers in the first segment for the first advertising space;

determining a second real-time estimate of impressions by second consumers in a second segment for the first advertising space;

determining that a highest estimated impressions for the first advertising space include the first and second real-time estimates; and presenting, by fourth user interface element of the user interface, the highest estimated impressions for the first advertising space;

determining that the first estimate of impressions for the first advertising space satisfies a first value;

determining a first advertisement corresponding to the first segment;

determining to submit the first advertisement for the first advertising space to an advertisement exchange based on the estimate of impressions satisfying the first value; and sending information corresponding to the first advertisement to an advertisement exchange.

2. The method of claim 1, wherein the second segment of second consumers having one or more common second attributes, a second attribute of the one or more common second attributes being respective shipping addresses associated with online shopping activity and within the first area;

determining that the first real-time estimate of impressions exceeds the second real-time estimate of impressions; and determining to submit the first advertisement for the first advertising space to an advertisement exchange based on the first real-time estimate of impressions exceeding the second real-time estimate of impressions.

3. The method of claim 1 further comprising:

determining that the first real-time estimate of impressions for the first advertising space is less than a second value;

determining a second advertising space located in the first area;

determining a third real-time estimate of impressions for the second advertising space and corresponding to the first segment; and determining that the third real-time estimate of impressions for the second advertising space satisfies the second value.

4. The method of claim 1, further comprising determining a distance from a first shipping address of a first consumer in the first segment to the advertising space using one of a Euclidian distance formula or a Manhattan distance formula.

5. The method of claim 1, further comprising:

determining an advertisement corresponding to at least one of the one or more common attributes.

6. A system comprising:

memory configured to store computer-executable instructions, and at least one computer processor configured to access memory and execute the computer-executable instructions to:

present a user interface, wherein the user interface comprises:

a first user interface element allowing a user to select from a plurality of selectable radii;

a second user interface element allowing the user to select from a plurality of selectable distance types that includes one or more of Euclidian distance, driving distance or Manhattan distance;

a third user interface element allowing the user to select one or more selectable digital out of home (DOOH) spaces from a plurality of selectable DOOH spaces; and a fourth user interface element, determined based at least in part on the first user interface element, the second user interface element, and the third user interface element;

determine a first attribute corresponding to a first consumer, wherein the first attribute is associated with an online shopping activity that includes a shipping address;

determine a first segment corresponding to the first attribute and including the first consumer;

determine a first advertising space and a second advertisement space in a first area, wherein the first advertising space is a DOOH space of the plurality of selectable DOOH spaces, wherein the first area is based on a first radius and a first distance type, and the first distance type is selectable via the user interfaces form one or more of Euclidian distance, driving distance or Manhattan distance;

determine a first segment of consumers having one or more common attributes, a first attribute of the one or more common attributes being respective shipping addresses associated with online shopping activity and within the first area;

determine a first real-time estimate of impressions by consumers in the first segment for the first advertising space;

determine a second real-time estimate of impressions by second consumers in a second segment for the first advertising space;

determine that the highest estimated impressions for the first advertising space include the first and second real-time estimates;

present, by the fourth user interface element of the user interface, the highest estimated impressions for the first advertising space;

determine that the first real-time estimate of impressions for the first advertising space satisfies a first value;

determine a first advertisement corresponding to the first segment;

determine to submit the first advertisement for the first advertising space to an advertisement exchange based on the estimate of impressions satisfying the first value; and send information corresponding to the first advertisement to an advertisement exchange.

7. The system of claim 6, wherein at the least one computer processor is further configured to access memory and execute the computer-executable instructions to:

wherein the second segment of second consumers have one or more common second attributes, a second attribute of the one or more common second attributes being respective shipping addresses associated with online shopping activity and within the first area;

determine that the first real-time estimate of impressions exceeds the second estimate of impressions;

determine to submit the first advertisement for the first advertising space to an advertisement exchange based on the first real-time estimate of impressions exceeding the second estimate of impressions.

8. The system of claim 6, wherein at the least one computer processor is further configured to access memory and execute the computer-executable instructions to:
determine the first advertising space based on the first advertising space being located in the first area.

9. The system of claim 8, wherein at the least one computer processor is further configured to access memory and execute the computer-executable instructions to:
determine that the first real-time estimate of impressions for the first advertising space is less than a second value; and
determine that the second real-time estimate of impressions for the second advertising space satisfies the second value.

10. The system of claim 6, wherein at the least one computer processor is further configured to access memory and execute the computer-executable instructions to determine a distance from a first shipping address of a first consumer in the first segment to the advertising space using one of a Euclidian distance formula or a Manhattan distance formula.

11. The system of claim 6, wherein at the least one computer processor is further configured to access memory and execute the computer-executable instructions to:
determine an advertisement corresponding to at least one of the one or more common attributes.

\* \* \* \* \*

UNITED STATES PATENT AND TRADEMARK OFFICE
CERTIFICATE OF CORRECTION

| | | |
|---|---|---|
| PATENT NO. | : 11,948,170 B1 | Page 1 of 1 |
| APPLICATION NO. | : 17/114270 | |
| DATED | : April 2, 2024 | |
| INVENTOR(S) | : Sarp Arda Coskun et al. | |

It is certified that error appears in the above-identified patent and that said Letters Patent is hereby corrected as shown below:

In the Claims

Claim 1 at Column 21, Line 15 should read:
determining that the first real-time estimate of impressions for the Claim 1 at Column 21, Line 21 should read:
on the first real-time estimate of impressions satisfying the first value;

Claim 1 at Column 21, Lines 23- 24 should read:
sending information corresponding to the first advertisement to the advertisement exchange.

Claim 2 at Column 21, Line 26 should read:
wherein the second segment of second consumers have Claim 3 at Column 21, Line 42 should read:
determining the second advertising space located in the first Signed and Sealed this
Twenty-second Day of October, 2024

Katherine Kelly Vidal
*Director of the United States Patent and Trademark Office*